United States Patent
Matsuda et al.

(10) Patent No.: US 10,906,263 B2
(45) Date of Patent: Feb. 2, 2021

(54) COMPOSITE MOLDING AND METHOD OF MANUFACTURING THE SAME

(71) Applicant: FUJIKURA COMPOSITES INC., Tokyo (JP)

(72) Inventors: Kahori Matsuda, Saitama (JP); Toshikazu Shirose, Saitama (JP)

(73) Assignee: FUJIKURA COMPOSITES INC., Tokyo (JP)

( * ) Notice: Subject to any disclaimer, the term of this patent is extended or adjusted under 35 U.S.C. 154(b) by 0 days.

(21) Appl. No.: 16/754,931

(22) PCT Filed: Dec. 4, 2017

(86) PCT No.: PCT/JP2017/043493
§ 371 (c)(1),
(2) Date: Apr. 9, 2020

(87) PCT Pub. No.: WO2019/111297
PCT Pub. Date: Jun. 13, 2019

(65) Prior Publication Data
US 2020/0262112 A1   Aug. 20, 2020

(51) Int. Cl.
*B32B 1/02* (2006.01)
*B29C 45/14* (2006.01)
*F16J 3/02* (2006.01)
*B32B 1/08* (2006.01)

(52) U.S. Cl.
CPC .......... *B32B 1/02* (2013.01); *B29C 45/14065* (2013.01); *B32B 1/08* (2013.01); *F16J 3/02* (2013.01); *B29C 2045/14147* (2013.01)

(58) Field of Classification Search
CPC .................................. B32B 1/02; B32B 1/08
See application file for complete search history.

(56) References Cited

FOREIGN PATENT DOCUMENTS

| JP | S62-127571 A | 6/1987 |
|---|---|---|
| JP | H02-072271 A | 3/1990 |
| JP | H05-070923 A | 9/1993 |
| JP | 2003-130218 A | 5/2003 |
| JP | 3962295 B2 | 8/2007 |
| JP | 2010-203081 A | 9/2010 |
| JP | 2017-024572 A | 2/2017 |

OTHER PUBLICATIONS

International Search Report for Application No. PCT/JP2017/043493 dated Feb. 26, 2018.

*Primary Examiner* — Walter Aughenbaugh
(74) *Attorney, Agent, or Firm* — McCormick, Paulding & Huber PLLC

(57) ABSTRACT

To provide a composite molding and a method of manufacturing the same, capable of preventing insufficient filling of a rubber member and improving a product yield, the composite molding has a resin member and a rubber member molded to cover upper and lower faces of the resin member. A plurality of holes communicating with the resin member are provided in at least one of faces of the rubber member. The holes are loopholes of pins that support the resin member during molding of the rubber member while being spaced from a mold die.

6 Claims, 6 Drawing Sheets

COMPOSITE MOLDING AND METHOD OF MANUFACTURING THE SAME

CROSS REFERENCE TO RELATED APPLICATION

This application is a National Stage application of International Patent Application No. PCT/JP2017/043493 filed on Dec. 4, 2017, which is hereby incorporated by reference in its entirety.

TECHNICAL FIELD OF THE INVENTION

The present invention relates to a composite molding including a resin member and a rubber member and a method of manufacturing the same.

BACKGROUND OF THE INVENTION

For example, Japanese Unexamined Patent Application Publication No. 2010-203081 discusses a diaphragm valve used as a main valve of a flush valve. In Japanese Unexamined Patent Application Publication No. 2010-203081, the diaphragm valve is a composite molding including a holding member formed of resin and a diaphragm film formed of an elastic material.

Using the composite molding formed of resin and rubber, a lightweight and simple structure can be obtained. In Japanese Unexamined Patent Application Publication No. 2010-203081, two holding members formed of resin are provided, and the diaphragm film formed of a rubber member is interposed between the two holding members. In this case, since a plurality of holding members are provided, the number of parts increases disadvantageously.

In this regard, if the rubber member is injection-molded on the upper and lower faces of the resin member, it is possible to provide a simpler structure.

SUMMARY OF THE INVENTION

However, an injection pressure of the rubber material is applied to a surface of the resin member provided in the mold die. For this reason, the resin member is easily deformed during molding of the rubber member. As a result, a region of insufficient filling of the rubber member is easily formed disadvantageously. That is, if the resin member is deformed inside the mold die, for example, a flow path of the rubber material is blocked or becomes excessively narrowed. As a result, fluidity of the rubber material inside the mold die is degraded, and an insufficient filling region of the rubber member is generated disadvantageously.

In view of the aforementioned problems, it is therefore an object of the invention to provide a composite molding and a method of manufacturing the same, capable of preventing insufficient filling of the rubber member and improving a product yield.

According to an aspect of the invention, there is provided a composite molding including: a resin member; and a rubber member molded to cover upper and lower faces of the resin member, wherein a plurality of holes communicating with the resin member are provided on at least one of the faces of the rubber member, and the holes are loopholes or release holes formed by pins that support the resin member during molding of the rubber member while being spaced from a mold die.

In this aspect of the invention, it is preferable that the plurality of holes are formed at equal intervals along an outer edge of the resin member.

In this aspect of the invention, it is preferable that the outer edge forms an elbowed bent portion, the rubber member forms a projecting portion projecting from the one of the faces of the rubber member at a position of the bent portion, and the holes are formed along a projecting face of the projecting portion.

In this aspect of the invention, it is preferable that the projecting face has wide portions formed at equal intervals along a circumferential direction with a large width, and the holes are formed in the wide portions.

In this aspect of the invention, it is preferable that the projecting portion has an inner wall surface serving as a guide surface for another member.

In this aspect of the invention, for example, the composite molding is a diaphragm.

According to another aspect of the invention, there is provided a method of manufacturing a composite molding having a resin member and a rubber member molded to cover upper and lower faces of the resin member, the method including: installing the resin member inside a mold die, at this time, by allowing a plurality of pins to abut on the lower face of the resin member to support the lower face of the resin member while being spaced from the mold die; injecting a rubber material into the mold die to mold the rubber member to cover the upper and lower faces of the resin member; and releasing the mold die.

According to the present invention, it is possible to provide a composite molding and a method of manufacturing the same, capable of suppressing insufficient filling of the rubber member and improving a product yield.

BRIEF DESCRIPTION OF DRAWINGS

FIGS. 5A and 5B are explanatory diagrams illustrating a use example of a composite product according to an embodiment of the invention, in which FIG. 5A is a plan view, and FIG. 5B is a cross-sectional view taken along a line C-C of FIG. 5A; and FIGS. 6A to 6C are explanatory diagrams illustrating a use example of a composite product according to an embodiment of the invention, in which FIG. 6A is a plan view, and FIGS. 6B and 6C are cross-sectional views taken along a line D-D of FIG. 6A.

DETAILED DESCRIPTION

An embodiment of the invention (hereinafter, simply referred to as an "embodiment") will now be described in details. Note that the invention is not limited to the following embodiments, and various modifications may be possible within the scope of the subject matter.

Figure 1A:
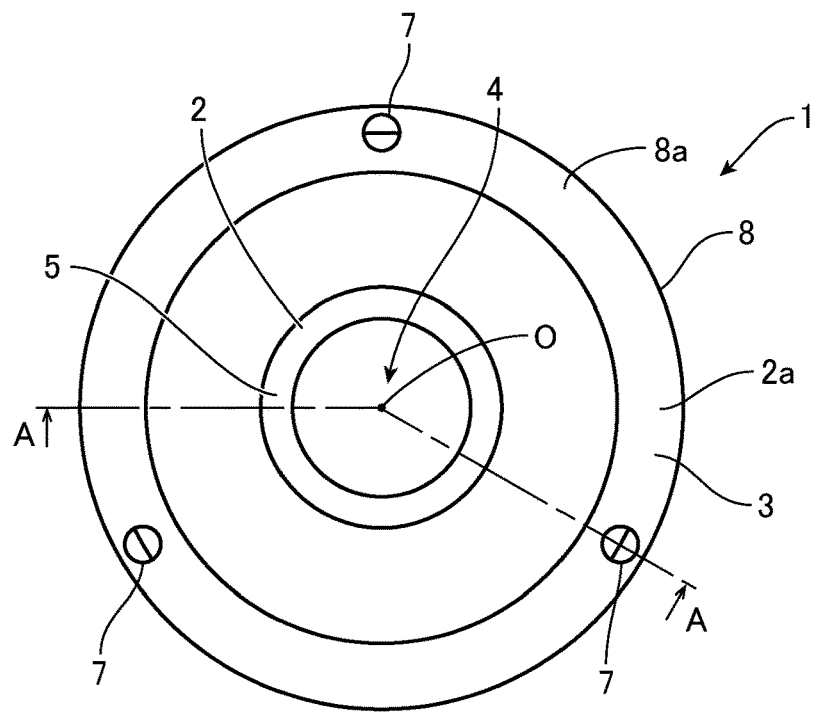
FIG. 1A is a plan view illustrating a composite molding according to an embodiment of the invention.
Figure 1B:
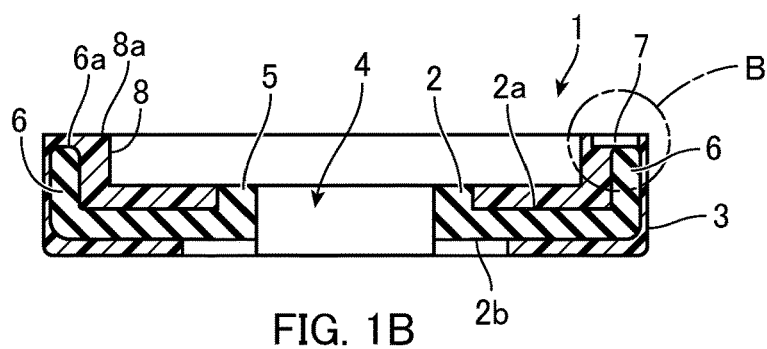
FIG. 1B is a cross-sectional view taken along a line A-A of the composite molding of FIG. 1A.

As illustrated in FIGS. 1A and 1B, a composite molding 1 according to this embodiment has a resin member 2 and a rubber member 3 molded to cover the resin member 2 across an upper face 2a and a lower face 2b.

According to the embodiment of FIG. 1A, the resin member 2 is a circular plate member and has an opening 4 in the center of the resin member 2. Note that the opening 4 is not indispensable and may be formed as necessary.

As illustrated in FIGS. 1A and 1B, the resin member 2 has a bent portion 6 bent upward at an outer edge.

In FIGS. 1A and 1B, the resin member 2 has a circular shape. However, the resin member 2 may have other shapes.

The bent portion 6 of FIGS. 1A and 1B may not be formed across the entire periphery of the bent portion 6, but may be truncated in at least one or more places.

As illustrated in FIGS. 1A and 1B, the rubber member 3 covers an upper face 2a, a lower face 2b, and an outer circumferential face of the resin member 2. However, the rubber member 3 is not formed on an inner wall surface of the opening 4 or upper and lower faces of the ring-shaped portion 5 that surround a periphery of the opening 4. In addition, the rubber member 3 constitutes a ring-shaped projecting portion 8 projected upward to cover the bent portion 6 of the resin member 2. As illustrated in FIG. 1A, a plurality of holes 7 are excavated on a projecting face 8a of the projecting portion 8.

Figure 1C:
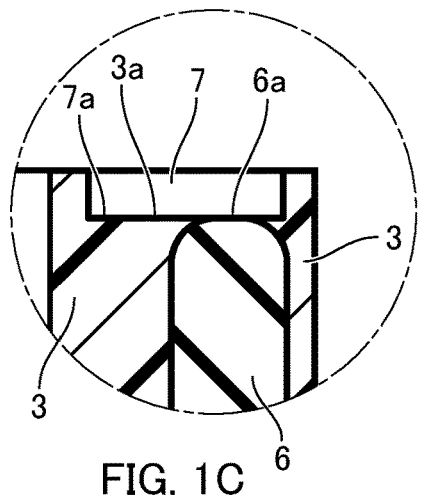
FIG. 1C is an enlarged cross-sectional view illustrating a part B of FIG. 1B.

The holes 7 will be described. FIG. 1C is a partial enlarged cross-sectional view illustrating a part B of FIG. 1B. As illustrated in FIG. 1C, an upper face 6a of the bent portion 6 is seen on the bottom face 7a of the hole 7. In addition, a hollow bottom face 3a of the rubber member 3 coplanar with the upper face 6a of the bent portion 6 is also seen. Only the upper face 6a of the bent portion 6 may be seen from the hole 7. However, a part of the rubber member 3 other than the upper face 6a of the bent portion 6 is also preferably seen.

As illustrated in FIG. 1A, a plurality of holes 7 are preferably formed at equal intervals along the projecting face 8a. In other words, angles formed by connecting a center O of the resin member 2 and centers of each hole 7 with straight lines are preferably set to be equal.

Figure 2A:
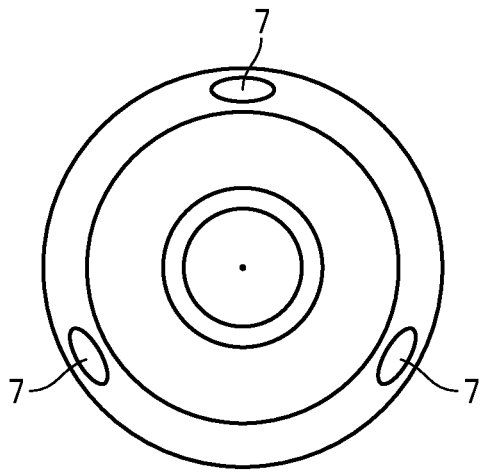
FIGS. 2A to 2E are plan views illustrating a composite molding according to another embodiment different from that of FIG. 1A.
Figure 2B:
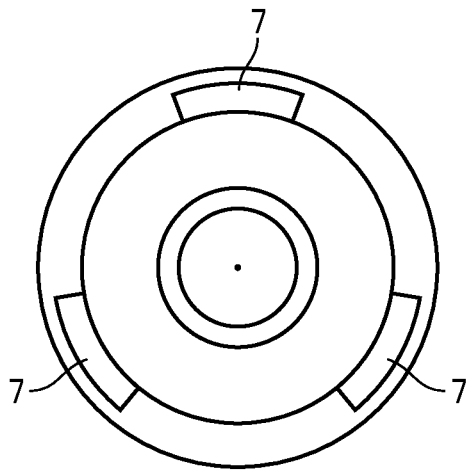
Figure 2C:
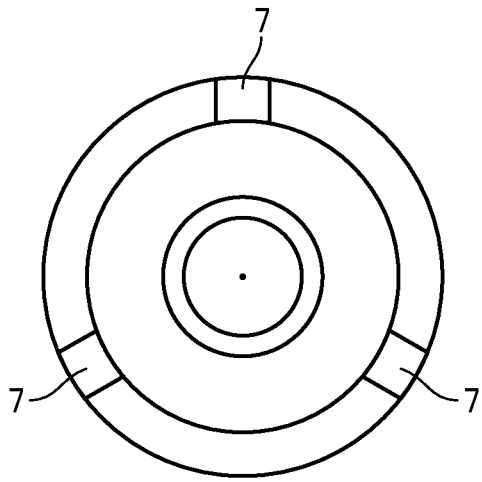
Figure 2D:
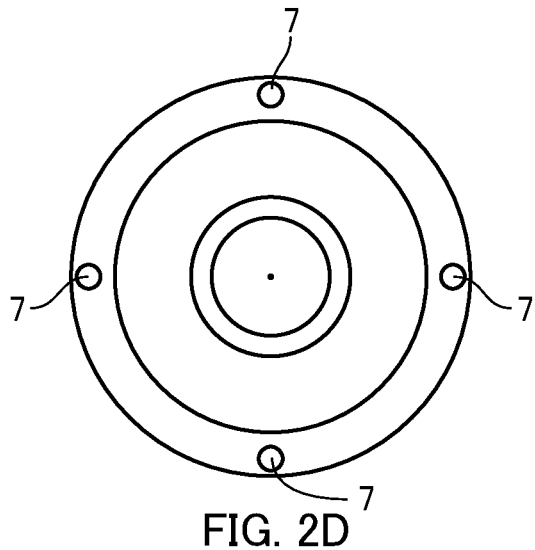
Figure 2E:
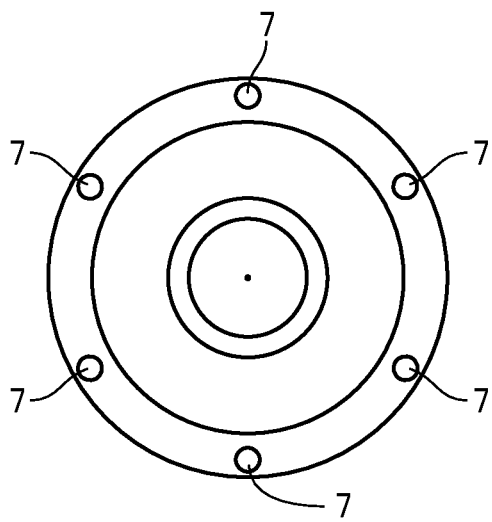

The holes 7 of FIG. 1A have a circular shape, but the shape of the hole 7 is not limited. For example, as illustrated in FIG. 2A, the hole 7 may have an elliptical shape. As illustrated in FIG. 2B, the hole 7 may have a linear shape. As illustrated in FIG. 2C, the hole 7 may have a rectangular shape. In addition, the number of the holes 7 is not limited. For example, the number of the holes 7 may be set to four as illustrated in FIG. 2D, or the number of the holes 7 may be set to six as illustrated in FIG. 2E. As illustrated in FIGS. 2D and 2E, each hole 7 is preferably formed at equal intervals. Note that the number of the holes 7 is preferably set to three or more.

Each hole 7 is a release hole from the pin to support that supports the resin member 2 during molding of the rubber member 3 while being spaced from the mold die.

Figure 3A:
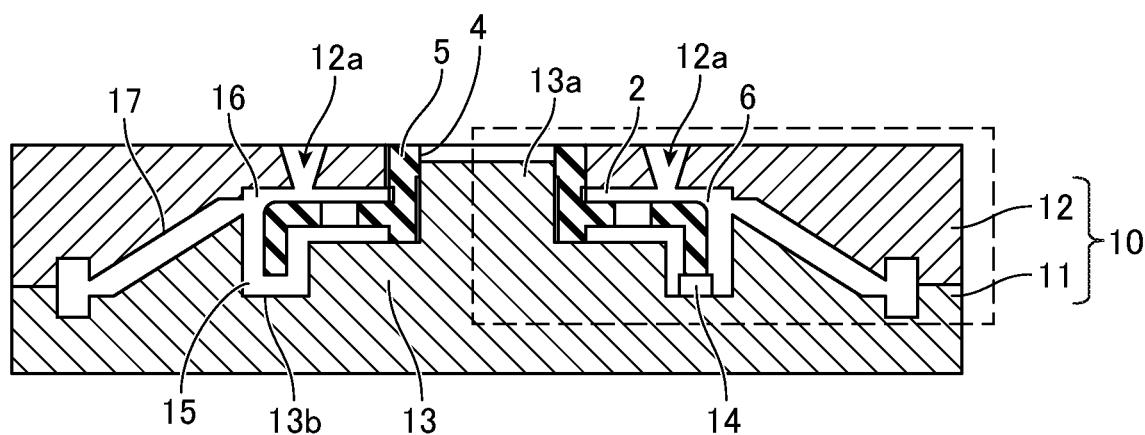
FIG. 3A is a cross-sectional view illustrating a mold die for manufacturing a composite molding according to an embodiment of the invention.
Figure 3B:
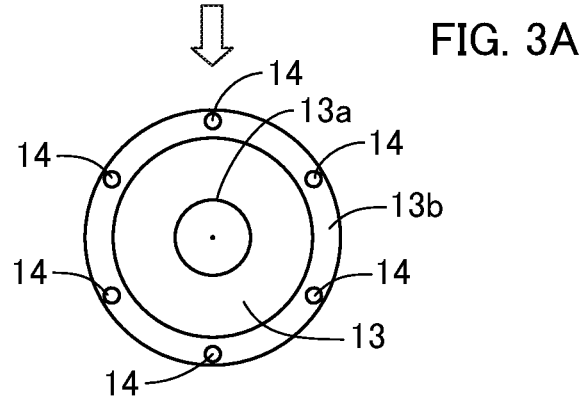
FIG. 3B is a plan view illustrating a lower die.

A method of manufacturing the composite molding 1 according to this embodiment will now be described. As illustrated in FIG. 3A, the resin member 2 is installed in the mold die 10. The mold die 10 has a lower die 11 and an upper die 12. The lower die 11 has a mount 13 having a height difference, and a center protrusion 13a is provided in the center of the mount 13. As illustrated in FIGS. 3A and 3B, the mount 13 and the center protrusion 13a have cylindrical shapes having different diameters. In addition, as illustrated in FIGS. 3A and 3B, a ring-shaped hollow bottom face 13b is formed around the mount 13. As illustrated in FIG. 3B, the hollow bottom face 13b has a plurality of pins 14 spaced with a predetermined interval. A plurality of pins 14 are formed at equal intervals. The number of the pins 14 is preferably set to three or more.

Referring to FIG. 3A, the center protrusion 13a of the lower die 11 is inserted into the opening 4 of the resin member 2 such that the bent portion 6 of the resin member 2 is directed downward. As a result, the resin member 2 can be held in the lower die 11. Note that the center protrusion 13a has a diameter approximately equal to that of the opening 4.

As illustrated in FIG. 3A, the bent position 6 of the resin member 2 abuts on the pins 14. In this case, the ring-shaped portion 5 around the opening 4 of the resin member 2 also abuts on the surface of the mount 13. As illustrated in FIG. 3A, a predetermined space 15 is provided between a lower face of the bent portion 6 that does not abut on the pin 14 and the hollow bottom face 13b. In addition, the interval 15 is also provided between the resin member 2 and the mount 13.

As illustrated in FIG. 3A, the resin member 2 is interposed between the lower die 11 and the upper die 12. As illustrated in FIG. 3A, the upper die 12 is provided with an injection port 12a for the rubber material. As illustrated in FIG. 3A, a space 16 communicating with the injection port 12a is provided between the resin member 2 and the upper die 12. Note that, as illustrated in FIG. 3A, a space 17 extending outward of the spaces 15 and 16 and communicating with the spaces 15 and 16 is provided between the lower die 11 and the upper die 12.

Figure 4A:
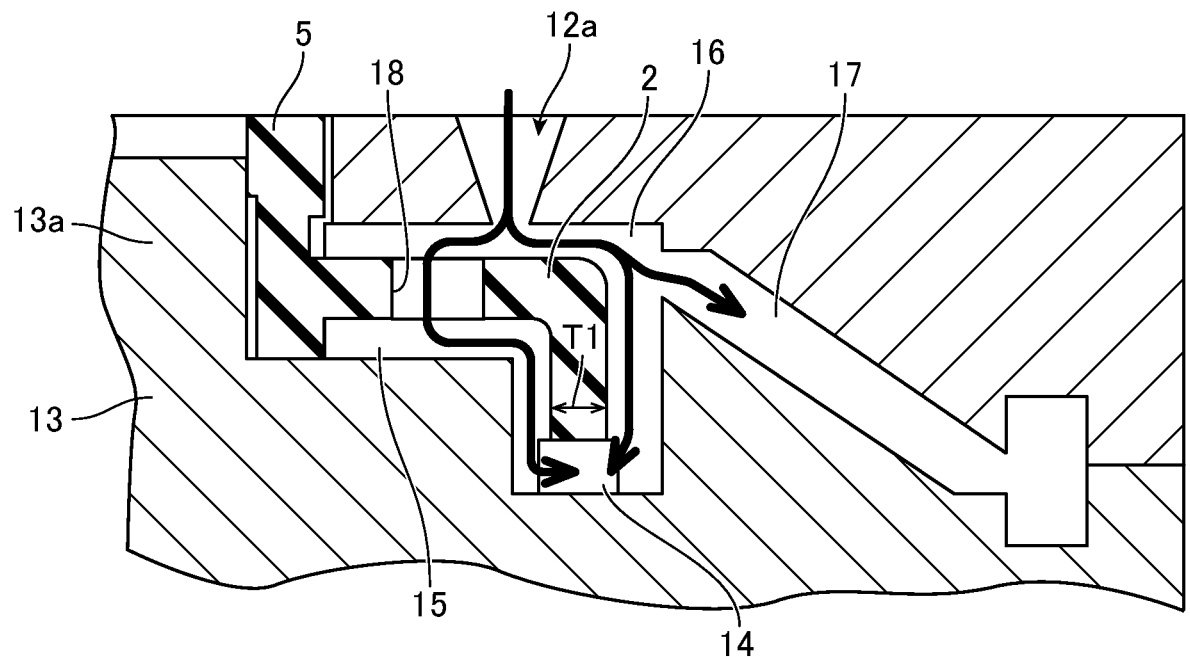
FIG. 4A is a rear view illustrating a resin member provided inside the mold die.
Figure 4B:
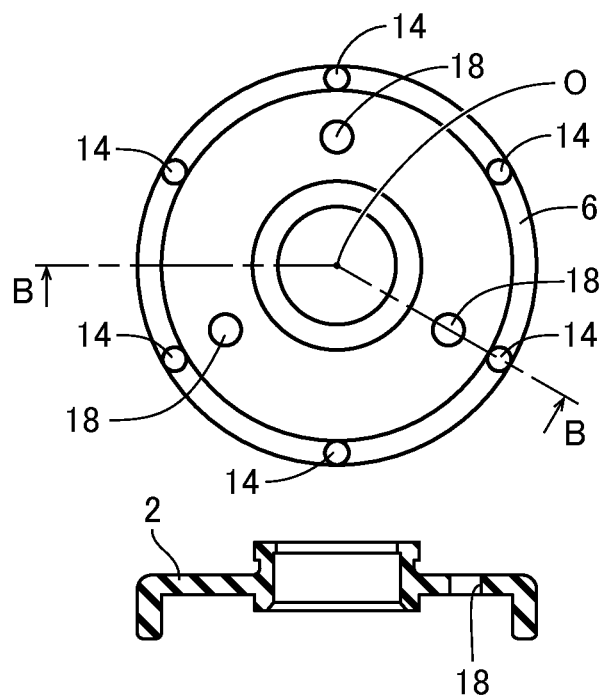
FIG. 4B is a cross-sectional view taken along a line B-B of FIG. 4A.

The rubber material is injected from the injection port 12a of FIG. 3A. FIG. 4A is a partial enlarged cross-sectional view illustrating the dotted part of FIG. 3A. As illustrated in FIG. 4A, the rubber material flows along the arrow direction inside the spaces 15, 16, and 17 of the mold die 10 from the injection port 12a. As illustrated in FIG. 4A, the resin member 2 is provided with a through-hole 18 inside of the bent portion 6, and the rubber material is also appropriately applied to the back face of the resin member 2 through the through-hole 18. As illustrated in FIG. 4B, a plurality of through-holes 18 are provided. Preferably, the through-holes 18 are located on a circular line from the center O of the resin member 2 and are provided at equal intervals, but the locations of the through-holes 18 are not limited thereto. In addition, as illustrated in FIG. 4B, for example, each through-hole 18 is located on a straight line connecting the center O of the resin member 2 and the position of the pin 14 abutting on the bent portion 6 of the resin member 2. Since the pin 14 itself blocks the flow path of the rubber material, the fluidity of the rubber material decreases in the vicinity of the pin 14, or the rubber material is likely to stay. Therefore, by forming a flow path for flowing the rubber material from the front face side to the back face side of the resin member 2 in the vicinity of the pin 14, it is possible to appropriately secure the fluidity of the rubber material in the vicinity of the pin 14.

Note that, preferably, the through-holes 18 are provided in three or more places in order to stably fix the resin member 2 such that rubber material wraps all over the back face of the resin member 2, but the number of through-holes 18 is not limited.

As illustrated in FIG. 4A, the rubber material injected from the injection port 12a into the mold die 10 collides with the upper face of the resin member 2 and is divided into a route passing through the through-hole 18 and a route passing through the outer side of the bent portion 6 as indicated by the arrows. The rubber material flowing through the route passing through the through-hole 18 is filled into the lower face of the resin member 2. Meanwhile, the rubber material flowing through the route passing through the outer side of the bent portion 6 is filled into the upper face and the side face of the resin member 2. As illustrated in FIG. 4A, the rubber materials divided into two routes are fused in the vicinity of the lower face of the bent portion 6 (in the vicinity of the pin 14 in a place where the pin 14 exists).

Note that, according to this embodiment, the rubber material is also filled in the space 17 outward of the resin member 2. The composite molding formed using this mold die constitutes, for example, a diaphragm.

According to this embodiment, when the rubber member 3 is molded, an end of the resin member 2 inside the mold die 10 abuts on the pin 14 (at the position of the bent portion 6 in the aforementioned embodiment) and is supported by the pin 14 while the resin member 2 is spaced from the mold die 10. As a result, the resin member 2 can be held in a floating state inside the molding die 10. When it is not supported by the pin 14, the surface of the resin member 2 is easily pressed and deformed by the injection pressure of the rubber material. General purpose resins or super engineering plastics are more likely to be deformed by the application of heat because of their large thermal deformation. If the resin member blocks the space 15 (see FIG. 3A) between the bent portion 6 and the hollow bottom face 13b by deformation of the resin, it is difficult to flow the rubber material and suitably fill the rubber member. In addition, if the flow path is narrowed beyond a predetermined level, the fluidity of the rubber material is degraded, and as a result, an insufficient filling region of the rubber member easily occurs.

In this regard, according to this embodiment, since the end of the resin member 2 is supported by the pin 14, it is possible to suppress deformation of the resin member 2 caused by the injection pressure of the rubber material. According to this embodiment, the end of the resin member 2 is supported by the pin 14, and the portion having no pin 14 forms the space 15. Therefore, it is possible to appropriately fuse the rubber material flowing separately along the front face and the back face of the resin member 2 using the space 15.

By releasing the composite molding 1 formed by molding the rubber material on the resin member 2 from the mold die, a plurality of holes 7 from which the pins 14 are removed are formed in the rubber member 3 (see FIGS. 1 and 2). That is, since the rubber material is not injected into the part of the pin 14 illustrated in FIG. 4A, the hole 7 is formed as a release hole from the pin 14 upon releasing the mold die. Therefore, this hole 7 communicates with the resin member 2.

As illustrated in FIG. 4A, the pin 14 has a diameter wider than the width T1 of the lower face of the bent portion 6. However, as a result, the pin 14 can reliably come into contact with the lower face of the bent portion 6. In addition, since the pin 14 has a diameter φ1 wider than the width T1 of the lower face of the bent portion 6, the hollow bottom face 3a of the rubber member 3 as well as the face of the bent portion 6 (upper face 6a in FIG. 1C) is also exposed on the bottom face 7a of the hole 7 immediately after the pin 14 is removed.

According to this embodiment, a plurality of pins 14 are provided inside the mold die 10. As a result, it is possible to suitably suppress deformation of the resin member 2 caused by the injection pressure of the rubber material. By providing two or more pins 14, it is possible to suppress deformation of the resin member 2 caused by the injection pressure of the rubber material, compared to a configuration having no pin 14. In addition, even when the number of the pins 14 is little, it is possible to easily suppress deformation of the resin member 2, for example, by forming the pins 14 having a wide shape as illustrated in FIGS. 2A to 2C. However, if three or more pins 14 are provided, it is possible to more suitably suppress deformation of the resin member 2 caused by the injection pressure of the rubber material.

There is no upper limitation in the number of the pins 14. However, as the number of the pins 14 increases, an interval between the pins 14 is narrowed. That is, the floatable space 15 of the rubber material is narrowed. Therefore, the number of the pins 14 is preferably set to a number that does not affect the fluidity of the rubber material. For example, the number of the pins 14 is preferably set such that a total width of the space 15 between the pins 14 is larger than a total width of the pins 14.

Although there is no limitation in the material of the resin member 2 or the rubber member 3, the resin material used in the resin member may include, for example, polyphenylene sulfide resin (PPS), polyether ether ketone resin (PEEK), a liquid crystal polymer (LCP), polybutylene terephthalate resin (PBT), polyethylene terephthalate resin (PET), polyphthalamide resin (PPA), nylon 6 (PA6), nylon 66 (PA66), ABS, or the like.

The rubber material used for the rubber member 3 may include ethylene propylene diene rubber (EPDM), nitrile rubber (NBR), hydrogenated nitrile rubber (HNBR), fluorine rubber (FKM), silicon rubber (Q), chloroprene rubber (CR), styrene butadiene rubber (SBR), acrylic rubber (ACM), epichlorohydrin rubber (CO), an elastomer such as a thermoplastic elastomer (TPE), an olefinic elastomer (TPO), thermoplastic polyurethane elastomer (TPU), an amide-based thermoplastic elastomer (TPA), a styrene-based thermoplastic elastomer (TPS), and a thermoplastic polyester elastomer (TPC), or the like.

Figure 5A:
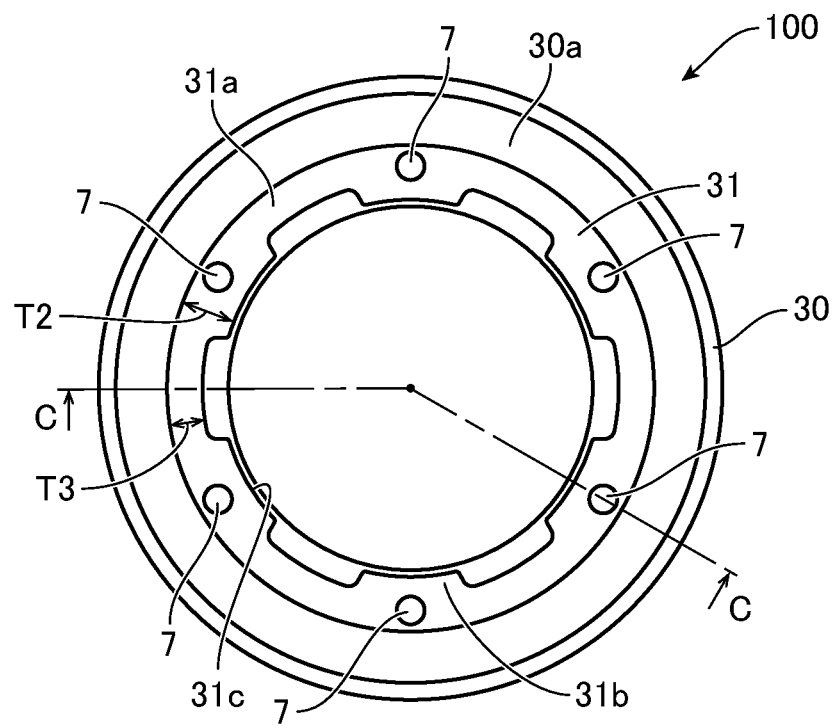

FIG. 5A is a plan view illustrating a composite molding 100 different from that of FIG. 1A according to another embodiment. The composite molding 100 may be molded using the mold die 10 of FIG. 3.

As illustrated in FIG. 5A, a projecting portion 31 projecting in a ring shape is formed inward of the outer edge of the rubber member 30 on the upper face 30a of the rubber member 30. This projecting portion 31 is formed at the position of the bent portion 6 of the resin member 2 as illustrated in FIG. 5B.

As illustrated in FIG. 5A, a plurality of holes 7 communicating with the bent portion 6 of the resin member 2 are formed at equal intervals on the projecting face 31a of the projecting portion 31. As described above, the holes 7 are release holes from the pins 14 that support the resin member 2 during molding of the rubber member 30 while being spaced from the mold die 10.

As illustrated in FIG. 5A, the width T2 of the projecting face 31a positioned in the hole 7 is wider than the width T3 of the projecting face 31a between the holes 7. The holes 7 are formed in wide portions 31b on the projecting face 31a. In this manner, by forming the holes 7 in the wide portions 31b, it is possible to surround the holes 7 with the rubber member 30 having a suitable width. Therefore, it is possible to maintain the rubber member 30 around the hole 7 with a suitable strength.

Figure 5B:
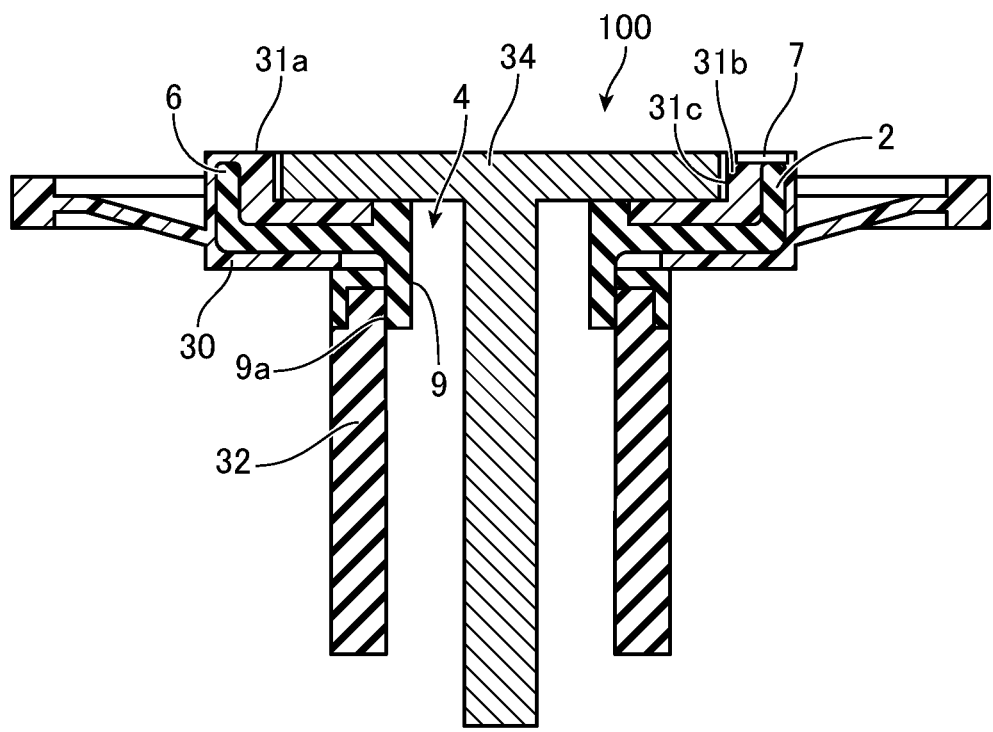

The composite molding 100 of FIG. 5 is used, for example, as a diaphragm of a flush valve. As illustrated in FIG. 5B, a valve 34 as a member separate from the composite product 100 is inserted into the opening 4 provided in the center of the resin member 2. In this case, an inner wall surface 31c of the wide portion 31b of the projecting portion 31 of FIG. 5A may be used as a guide surface of the valve 34 as illustrated in FIG. 5B.

As illustrated in FIG. 5A, the resin member 2 of the composite molding 100 is provided with a shaft portion 9 having the opening 4, and a thread portion is provided on an outer circumferential surface 9a of the shaft portion 9. In addition, the composite molding 100 according to this embodiment may be installed in an installation member 32 using the thread portion.

The composite molding 100 according to this embodiment may be installed, for example, in a flush valve as a water supply control valve of a toilet bowl.

Using the composite moldings 1 and 100 according to this embodiment, it is possible to appropriately mold the rubber members 3 and 30 on upper and lower faces of the resin member 2 while preventing occurrence of the insufficient filling region in the rubber members 3 and 30. Therefore, it is possible to appropriately use the composite molding 100 according to this embodiment as a diaphragm of a flush valve described above or for other use purposes.

According to this embodiment, a plurality of holes formed in the rubber member of the composite molding can be used, for example, as described below.

Figure 6A:
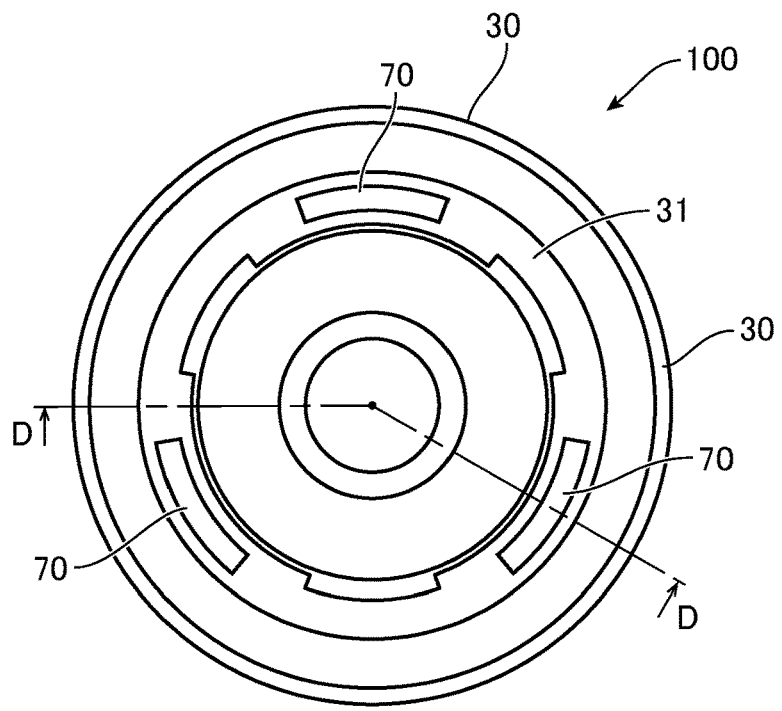

As illustrated in FIG. 6A, three holes 70 are provided in the rubber member 30. The holes 70 have a long hole shape. The holes 70 are for release holes from the pins that support the resin member 2 during the molding of the rubber member 30 while being spaced from the mold die 10.

Figure 6B:
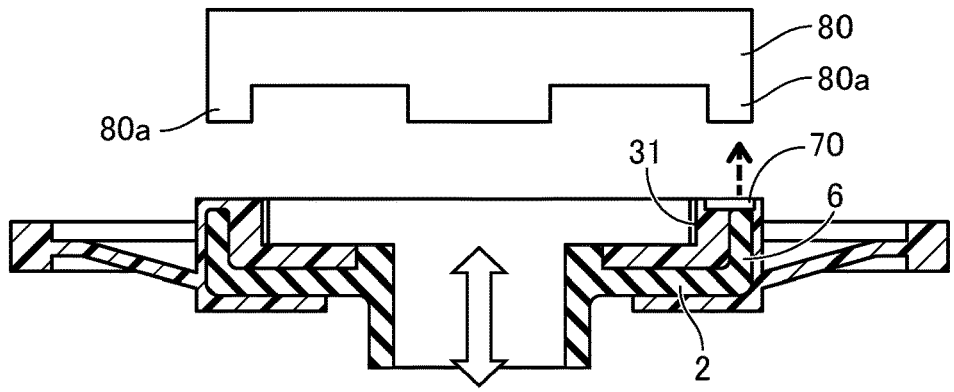

As illustrated in FIGS. 6A and 6B, a mating member 80 is arranged to face the upper face side of the composite molding 100 (the face where the holes 70 are provided). At least one of the composite molding 100 or the mating member 80 is controlled scrollable in a vertical direction. The projecting portion 31 of the rubber member 30 of FIG. 6A has an unevenness that can be used for alignment (guide surface) with the mating member 80. As a result, it is possible to allow the mating member 80 to reliably come into contact with the projecting portion 31 of the rubber member 30. As illustrated in FIG. 6B, a protrusion 80a is provided in the mating member 80. The protrusion 80a is sized, shaped, and positioned so as to be accurately inserted into the hole 70 provided in the rubber member 30 of the composite molding 100.

As illustrated in FIG. 6B, for example, when the composite molding 100 moves upward in the drawings, a movement distance can be controlled by a contact with the mating member 80. In this case, the mating member 80 may serve as a stopper by allowing the resin member 2 exposed to the bottom face inside the hole 70 of the composite molding 100 to come into contact with the bent position 6.

Figure 6C:
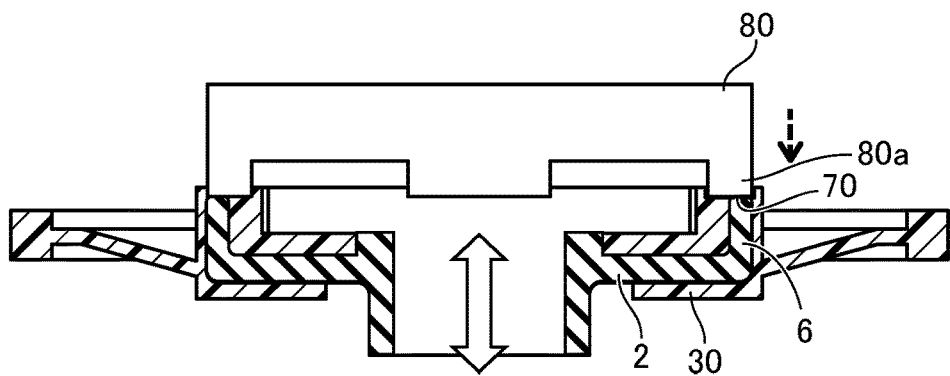

As illustrated in FIG. 6C, for example, when the mating member 80 moves downward, the protrusion 80a of the mating member 80 can be inserted into the hole 70 provided in the rubber member 30 of the composite molding 100 in order to assist a stroke.

In the embodiment described above, the bent position 6 is provided in the resin member 2. However, the bent position 6 may not be provided. For example, the resin member 2 may have a flat plate shape.

In the embodiment described above, the hole of the rubber member is formed in only one of the upper and lower faces of the resin member 2. However, the hole may be formed in both the upper and lower faces. In this case, the pin is provided also in the upper die as well as the lower die of the mold die, so that the resin member 2 is supported by the pins in both the lower and upper dies.

Using the composite molding according to the present invention, it is possible to suppress insufficient filling of the rubber member. Therefore, it is possible to improve a product yield and provide an excellent mass productivity with a small number of parts.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A composite molding comprising:
    a resin member (2) having upper (2a) and lower faces (2b); and
    a rubber member (3) molded to cover the upper and lower faces of the resin member,
    wherein a plurality of holes (7) communicating with at least one of the faces (2a, 2b) of the resin member at an outer edge of the resin member are provided in the rubber member,
    the holes (7) are release holes formed by pins (14) provided in a mold die to support the resin member (2) in spaced relationship with the mold die during molding of the rubber member (3),
    wherein the rubber member comprises a projecting portion (8, 31) that projects away from the one of the faces (2a, 2b) at the outer edge of the resin member, and
    the holes are formed in the rubber member along a projection face (8a, 31a) of the projecting portion (8, 31).

2. The composite molding according to claim 1, wherein the plurality of holes are formed in the rubber member at equal intervals along the projection face of the projecting portion.

3. The composite molding according to claim 1, wherein the outer edge of the resin member forms an elbowed bent portion, and
    the projecting portion projects from the one of the faces of the resin member at the position of the bent portion.

4. The composite molding according to claim 1, wherein the projection face of the projecting portion of the rubber member comprises wide portions formed at equal intervals along a circumferential path of the projecting portion, and
    the holes are formed in the wide portions.

5. The composite molding according to claim 1, wherein the projecting portion comprises an inner wall surface serving as a guide surface for another member.

6. The composite molding according to claim 1, wherein the composite molding is a diaphragm.

* * * * *